US010246366B2

(12) United States Patent
Oozeki et al.

(10) Patent No.: US 10,246,366 B2
(45) Date of Patent: Apr. 2, 2019

(54) METHOD OF MANUFACTURING OPTICAL FIBER BASE MATERIAL AND METHOD OF MANUFACTURING OPTICAL FIBER

(71) Applicant: FUJIKURA LTD., Tokyo (JP)

(72) Inventors: Nobuo Oozeki, Sakura (JP); Kentaro Ichii, Sakura (JP); Tomofumi Arai, Sakura (JP)

(73) Assignee: FUJIKURA LTD., Tokyo (JP)

( * ) Notice: Subject to any disclaimer, the term of this patent is extended or adjusted under 35 U.S.C. 154(b) by 743 days.

(21) Appl. No.: 13/628,444

(22) Filed: Sep. 27, 2012

(65) Prior Publication Data

US 2013/0081429 A1     Apr. 4, 2013

(30) Foreign Application Priority Data

Sep. 30, 2011 (JP) ................... 2011-216438
Jul. 24, 2012 (JP) ................... 2012-163407

(51) Int. Cl.
    *C03B 23/06* (2006.01)
    *C03C 15/00* (2006.01)
    *C03B 37/018* (2006.01)

(52) U.S. Cl.
    CPC ...... *C03B 37/01861* (2013.01); *C03B 23/065* (2013.01); *C03B 37/01869* (2013.01); *C03C 15/00* (2013.01); *C03B 2201/30* (2013.01); *C03B 2201/31* (2013.01); *C03B 2201/34* (2013.01); *C03B 2203/23* (2013.01)

(58) Field of Classification Search
    CPC ................ C03B 37/018; C03B 23/065
    USPC ......................................... 65/417
    See application file for complete search history.

(56) References Cited

U.S. PATENT DOCUMENTS

| 2,735,230 | A | * | 2/1956 | Morrill ........................ 65/55 |
| 3,920,435 | A | * | 11/1975 | Curtis .................. C03B 23/065 |
| | | | | 65/108 |
| 4,636,239 | A | * | 1/1987 | Wilson et al. .................. 65/109 |
| 5,160,520 | A | * | 11/1992 | Keim et al. ..................... 65/419 |
| 6,105,396 | A | * | 8/2000 | Glodis et al. .................... 65/377 |
| 6,314,765 | B1 | * | 11/2001 | Charlton et al. ................ 65/382 |
| 6,532,773 | B1 | * | 3/2003 | Mazzarese et al. ............. 65/378 |
| 6,550,280 | B1 | * | 4/2003 | Monberg et al. ............... 65/395 |
| 7,302,814 | B2 | * | 12/2007 | Kim et al. ....................... 65/384 |

(Continued)

FOREIGN PATENT DOCUMENTS

| JP | H02-172838 A | 7/1990 |
| JP | 2003-327442 A | 11/2003 |

(Continued)

OTHER PUBLICATIONS

Notice of Allowance dated Mar. 15, 2016, issued in counterpart Japanese Patent Application No. 2012163407, with Machine English translation. (6 pages).

*Primary Examiner* — John M Hoffmann
(74) *Attorney, Agent, or Firm* — Westerman, Hattori, Daniels & Adrian, LLP

(57) ABSTRACT

Provided is a method of manufacturing an optical fiber base material by an inside mounting method, including: a step of rotating and heating a glass tube fixed at two positions and supplying a gas into a through-hole of the glass tube, wherein in the step, the glass tube is warped so that an axis between respective fixed portions of the glass tube has a shape in which a catenary curve is reversed in the vertical direction.

17 Claims, 6 Drawing Sheets

(56) References Cited

U.S. PATENT DOCUMENTS

2002/0194880 A1* 12/2002 Rossi .................. C03B 19/1484
  65/421
2005/0231942 A1* 10/2005 Ueno .................... C03B 23/043
  362/216

FOREIGN PATENT DOCUMENTS

| JP | 2005-520776 A | 7/2005 |
|----|---------------|--------|
| WO | 20041009501 A1 | 1/2004 |

* cited by examiner

METHOD OF MANUFACTURING OPTICAL FIBER BASE MATERIAL AND METHOD OF MANUFACTURING OPTICAL FIBER

BACKGROUND OF THE INVENTION

1. Field of the Invention

The present invention relates to a method of manufacturing an optical fiber base material that may manufacture a highly reliable optical fiber and a method of manufacturing an optical fiber using the same.

2. Description of Related Art

As one of methods of manufacturing an optical fiber base material, an inside mounting method is known. In the inside mounting method, a glass tube of which both end portions are horizontally fixed and supported is heated while rotating about its axis. At the same time, a raw material gas is supplied to a through-hole of the glass tube, and a glass layer is laminated on the inner wall of the glass tube based on the raw material gas. Then, after a plurality of glass layers are laminated, the entire glass tube collapses, and hence an optical fiber base material is manufactured. As one of the inside mounting methods, an MCVD (Modified Chemical Vapor Deposition) method may be exemplified. In the MCVD method, the glass tube is heated from the outside thereof when the raw material gas is supplied to the through-hole of the glass tube. By the heating, soot which is generated from the raw material gas is deposited, and the deposited soot (fine glass particles) becomes a glass layer by the heat.

However, since the glass tube is heated while both end portions are fixed, the glass tube may be entirely bent in an arch shape or may be locally bent. The arch-like bending is different from the warpage caused by the own weight of the glass tube, and maintains the glass tube to be bent in a specific direction. Accordingly, when such a bending occurs, a whirling causing the eccentric rotation of the glass tube occurs with the rotation. The whirling also occurs even in a case where the glass tube is locally bent. Particularly, when the glass tube is long, the warpage amount caused by the own weight increases, and hence there is a tendency that the bending more easily occurs.

When the whirling caused by such a bending of the glass tube occurs, the temperature distribution in the circumferential direction of the glass tube increase with the rotation of the glass tube, and the thickness of the laminated glass layer may be easily different partially in the circumferential direction. For this reason, the eccentric amount of the core glass body in the manufactured optical fiber base material increases, and in the optical fiber manufactured by using the optical fiber base material, the eccentric amount of the core exceeds the allowable amount, which may degrade the reliability. Accordingly, it is preferable to suppress the warpage of the glass tube which causes the bending of the glass tube. In the case of the MCVD method, since the glass tube is heated from the outside, a portion close to the heat source and a portion away from the heat source are generated. Accordingly, the temperature distribution particularly increases, and hence there is a tendency that the eccentric amount of the core glass body in the optical fiber base material further increases.

As a method of suppressing the bending of the optical fiber base material, there is known a method of manufacturing an optical fiber base material disclosed in Japanese Patent Application National Publication No. 2005-520776. In the method of manufacturing the optical fiber base material, an auxiliary support member is used which supports the outer peripheral surface of the glass tube from the downside at the middle position of the glass tube of which both end portions are fixed. Then, the glass tube is heated while rotating in a state that the glass tube is supported by the auxiliary support member. Since the warpage of the glass tube during the heating in this way is suppressed, the above-described bending is suppressed and the eccentricity of the core glass body is reduced.

SUMMARY OF THE INVENTION

However, in the method of manufacturing the optical fiber base material, since the auxiliary support member comes into contact with the outer peripheral surface of the glass tube, the outer peripheral surface of the glass tube may be scratched or impurities may be attached to the glass tube. In such a case, when the optical fiber is manufactured by using the manufactured optical fiber base material, there is a possibility that the core may become partially eccentric due to the influence of the scratches on the base material or the optical fiber may have a partially different refractive index due to the influence of the impurities attached on the base material.

Accordingly, there is a concern that an optical fiber having low reliability may be manufactured.

Therefore, it is an object of the invention to provide a method of manufacturing an optical fiber base material that may manufacture a highly reliable optical fiber and a method of manufacturing an optical fiber using the same.

In order to attain the above-described object, the inventors repeated a careful examination and considered that when a pair of chucking portions fixing both end portions of the glass tube fixes the glass tube so as to be inclined upward (to fix the glass tube in an upward bent state) and the glass tube is warped upward, the bending caused when the glass tube is warped downward due to the own weight may be prevented. However, even in a case where the glass tube is fixed in this way, the bending may occur in some cases. The inventors concluded that the stress generated along the portion (the arch-like inner portion) positioned at the lower radial side of the glass tube is different from the stress generated along the portion (the arch-like outer portion) positioned at the upper radial side of the glass tube when the glass tube is simply warped upward in an arch shape. Therefore, the inventors further repeated a careful examination and contrived the invention.

That is, the present invention is to provide a method of manufacturing an optical fiber base material by an inside mounting method, containing a step of rotating and heating a glass tube fixed at two positions and supplying a gas into a through-hole of the glass tube, wherein in the step, the glass tube is warped so that an axis between respective fixed portions of the glass tube has a shape in which a catenary curve is reversed in the vertical direction.

Since the catenary curve is an arch-like curve when both end portions of a structure such as a rope or a wire are supported and its center portion is naturally dropped downward, in the method of manufacturing the optical fiber base material of the invention, the glass tube may be warped so as to rise upward. Here, there is a tendency that the heated glass tube is warped downward due to the own weight with the low viscosity. However, since the glass tube of the invention may be warped so that the axis has a shape in which the catenary curve is reversed in the vertical direction as described above in the heating step, a difference in force along the longitudinal direction of the glass tube is reduced between the upper radial portion of the glass tube and the lower radial portion of the glass tube. Accordingly, the above-described bending in which the glass tube is maintained to be locally bent or warped may be suppressed. For this reason, the whirling of the glass tube may be suppressed. Accordingly, in the inside mounting method, it is possible to suppress heat from being generated at the partial portion in the circumferential direction of the glass tube when heating the glass tube. For this reason, the thickness of the glass layer mounted inside becomes constant in the circumferential direction. In this way, the thickness of the glass tube is maintained to be constant. By using such processes, the eccentricity of the manufactured optical fiber base material is suppressed, and since a member such as an auxiliary support member that comes into contact with the glass tube at the middle position of the glass tube is not provided, the mixture of impurities may be prevented. Accordingly, such an optical fiber base material may manufacture a highly reliable optical fiber in which loss of light caused by the eccentricity or the impurities is suppressed.

Further, it is preferable that when an absolute value of an inclination of the axis in the fixed portions of the fixed glass tube is denoted by A, an absolute value of an inclination of the axis of the fixed portions of the glass tube obtained from an equation of a catenary curve of the glass tube is denoted by B, and a linear distance between the respective fixed portions is denoted by L, $$\frac{|B-A|}{L^2} \leq 0.000150$$

is satisfied.

Even in a case where both end portions of the glass tube are fixed so that the axis of the glass tube has a shape in which the catenary curve is reversed in the vertical direction, an inclination error of the axis of the fixed portion of the glass tube occurs due to the precision and the like of the device. The inventors found that the bending amount becomes 0.3 mm or less when the value obtained by dividing |B-A| as the absolute value of the error by the square of the distance between the respective fixed portions of the glass tube is 0.000150 or less. In such an amount, it is possible to manufacture an optical fiber base material that may manufacture a sufficiently highly reliable optical fiber.

Further, it is preferable that $$\frac{|B-A|}{L^2} \leq 0.000125$$

is satisfied.

In such an error, the bending amount may be suppressed to be 0.15 mm or less.

Further, it is preferable that $$\frac{|B-A|}{L^2} \leq 0.000100$$

is satisfied.

In an error satisfying these equations, the bending amount is substantially equal to the case without any error, the bending amount may be suppressed to be minimal.

Further, the gas is the raw material gas for laminating the glass layer, and in the step, the glass layer may be laminated on the inner wall of the glass tube by the raw material gas. Further, in this case, in the step, the MCVD method may be used.

The bending of the glass tube may be suppressed in the step of laminating the glass layer on the inner wall of the glass tube in this way. During the step, the bending of the glass tube is suppressed. Accordingly, the thickness of the glass layer laminated by the raw material gas becomes constant in the circumferential direction. As a result, the eccentricity of the optical fiber base material may be suppressed. Particularly, when the glass layer is laminated by using the MCVD method, the glass tube is heated from the outside as described above. Accordingly, when the bending of the glass tube occurs, the temperature distribution in the circumferential direction increases, and there is a tendency that the eccentric amount of the core glass body in the optical fiber base material further increases. However, according to the invention, a change in distance between the heat source and the glass tube is suppressed by suppressing the bending of the glass tube. For this reason, the soot derived from the raw material gas is deposited by suppressing a change in thickness in the circumferential direction. As a result, a change in the thickness of the glass layer is suppressed. Furthermore, the laminated glass layer may be the core glass body which becomes the core of the optical fiber, and may be the clad glass body which becomes the clad of the optical fiber.

Alternatively, it may be favorable that the gas is an etching gas, and in the step, the inner wall of the glass tube is etched by the etching gas.

When performing the inside mounting method, generally, the step of etching the inner wall of the glass tube is performed before the raw material gas is supplied to the glass tube or the glass layer is laminated by the raw material gas. Furthermore, the glass tube on which the glass layer is laminated indicates the glass tube on which the glass layer is not laminated yet and the glass tube formed of the laminated glass layer. In this case, the inner wall corresponds to the inner wall of the laminated glass layer. Even in a case where the inner wall of the glass tube is etched in this way, there is a concern that the bending of the glass tube may occur due to the heating of the glass tube. However, since the glass tube is warped so that the axis has a shape in which the catenary curve is reversed in the vertical direction as described above, it is possible to suppress the bending of the glass tube in the etching step. Accordingly, when the step in which the glass tube is warped as described above is the etching step performed before the raw material gas is supplied to the glass tube, the bending of the glass tube is suppressed in the step. Subsequently, when the glass layer is laminated on the inner wall of the glass tube, it is possible to suppress the soot from being unevenly distributed in the circumferential direction of the glass tube. Further, even when the step in which the glass tube is warped as described above is the etching step performed after the glass layer is laminated on the glass tube, the bending of the glass tube is suppressed. For this reason, it is possible to suppress the bending of the optical fiber base material manufactured by the following steps. In this way, it is possible to manufacture an optical fiber base material that may manufacture a highly reliable optical fiber.

In addition, a method of manufacturing an optical fiber of the present invention includes an optical fiber base material manufacturing step of manufacturing an optical fiber base material by using an inside mounting method, and a drawing step of drawing the optical fiber base material, wherein the optical fiber base material manufacturing step includes a step of rotating and heating a glass tube fixed at two positions and supplying a gas into a through-hole of the glass tube, and in the step, the glass tube is bent so that an axis between respective fixed portions of the glass tube has a shape in which a catenary curve is reversed in the vertical direction.

In the step in which the glass tube is heated, the glass tube is warped so that the axis of the glass tube between the fixed portions has a shape in which the catenary curve is reversed in the vertical direction, the bending of the glass tube may be suppressed. Accordingly, in the inside mounting method, it is possible to suppress the thickness of the laminated glass layer from being different in the circumferential direction. For this reason, the eccentricity of the manufactured optical fiber base material is suppressed, and the highly reliable optical fiber may be manufactured by drawing the optical fiber base material.

As described above, according to the invention, a method of manufacturing an optical fiber base material that may manufacture a highly reliable optical fiber and a method of manufacturing an optical fiber using the same are provided.

DETAILED DESCRIPTION OF EMBODIMENTS

Figure 1:
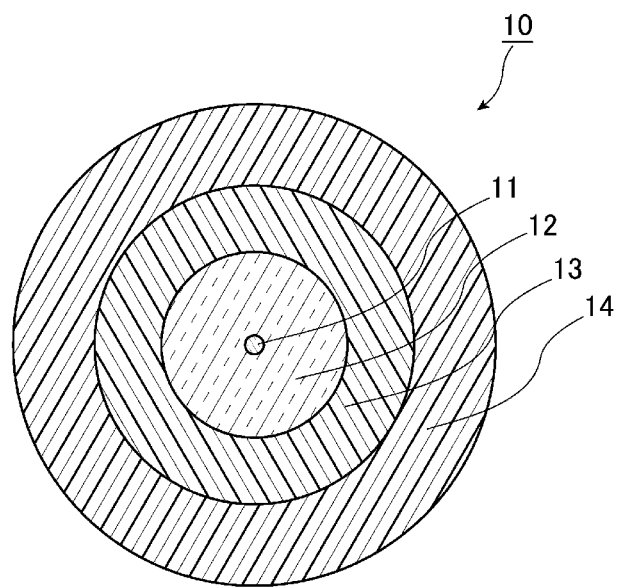
FIG. 1 is a diagram illustrating a structure of a cross section perpendicular to a longitudinal direction of an optical fiber according to a first embodiment of the invention.

Hereinafter, preferred embodiments of a method of manufacturing an optical fiber base material and a method of manufacturing an optical fiber according to the invention will be described by referring to the drawings.

First Embodiment

FIG. 1 is a diagram illustrating a structure of a cross section perpendicular to a longitudinal direction of an optical fiber according to a first embodiment of the invention. An optical fiber 10 of the embodiment is, for example, a single-mode fiber, and as illustrated in FIG. 1, includes a core 11, a clad 12 which surrounds the outer peripheral surface of the core 11, a first coating layer 13 which coats the outer peripheral surface of the clad 12, and a second coating layer 14 which coats the outer peripheral surface of the first coating layer 13. The refractive index of the clad 12 is lower than the refractive index of the core 11. As a material of forming such a core 11, for example, quartz to which an element of germanium increasing a refractive index is added may be exemplified. Further, as a material of forming the clad 12, for example, pure quartz to which no dorpant is added may be exemplified. Further, as a material of forming the first coating layer 13 and the second coating layer 14, for example, different types of UV-ray curable resins may be exemplified.

Figure 2:
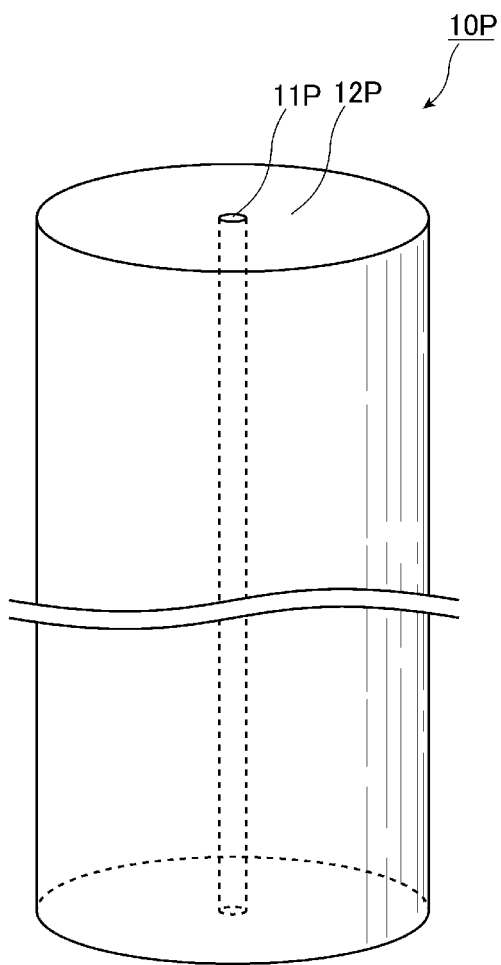
FIG. 2 is a diagram illustrating an optical fiber base material which is used to manufacture the optical fiber illustrated in FIG. 1.

Such an optical fiber 10 is manufactured by drawing an optical fiber base material as described below. FIG. 2 is a diagram illustrating the optical fiber base material which is used to manufacture the optical fiber 10 illustrated in FIG. 1. As illustrated in FIG. 2, an optical fiber base material 10P has a column shape, and includes a core glass body 11P which becomes the core 11 of the optical fiber 10 and a clad glass body 12P which surrounds the outer peripheral surface of the core glass body 11P and becomes the clad 12 of the optical fiber 10.

The core glass body 11P is formed of the same material as that of the core 11 of the optical fiber 10, and the clad glass body 12P is formed of the same material as that of the clad 12. Then, the ratio between the diameter of the core glass body 11P and the outer diameter of the clad glass body is substantially identical to the ratio between the diameter of the core 11 of the optical fiber 10 and the outer diameter of the clad 12.

Next, a method of manufacturing the optical fiber base material 10P and manufacturing the optical fiber 10 using the manufactured optical fiber base material 10P will be described.

Figure 3:
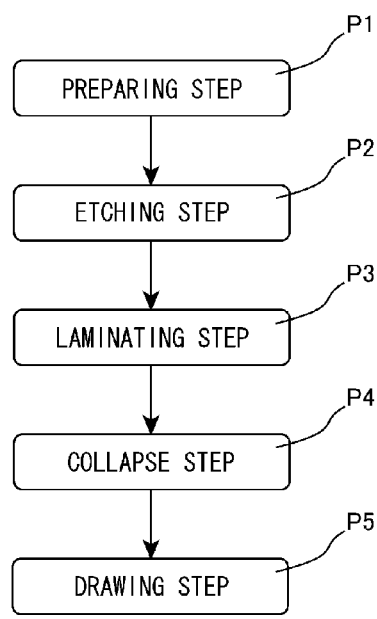
FIG. 3 is a flowchart illustrating a step of manufacturing the optical fiber base material and a step of manufacturing the optical fiber.

FIG. 3 is a flowchart illustrating a step of manufacturing the optical fiber base material 10P and a step of manufacturing the optical fiber 10. As illustrated in FIG. 3, the method of manufacturing the optical fiber base material 10P mainly includes a preparing step P1 in which a glass tube is set on a base material manufacturing device, an etching step P2 in which the inner wall of the glass tube is etched, a laminating step P3 in which a glass layer is laminated on the inner wall of the glass tube, and a collapse step P4 in which an optical fiber base material is obtained by crushing a through-hole of the glass tube. The method of manufacturing the optical fiber 10 mainly includes the respective steps and a drawing step P5 in which the optical fiber base material 10P is drawn.

<Preparing Step P1>

First, a glass tube is prepared. Since the glass tube becomes a part of the clad glass body 12P of the optical fiber base material 10P, the glass tube is formed of the same material as that of the clad 12 of the manufactured optical fiber 10. The surface of the prepared glass tube is cleaned if necessary.

Next, the glass tube is set on a base material manufacturing device.

Figure 4:
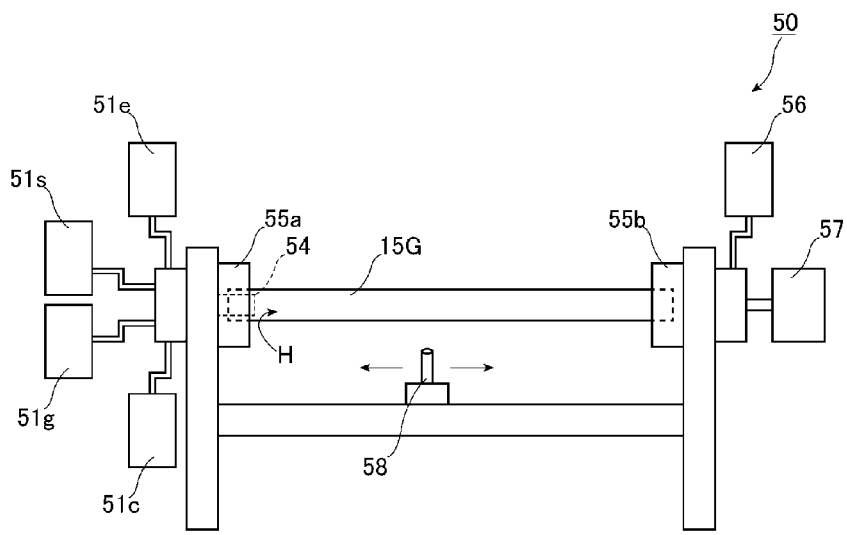
FIG. 4 is a diagram illustrating a base material manufacturing device on which a glass tube is set.

FIG. 4 is a diagram illustrating the base material manufacturing device on which a glass tube 15G is set. As illustrated in FIG. 4, a base material manufacturing device 50 mainly includes a pair of chucking portions 55a and 55b which is capable of fixing both end portions of the glass tube 15G, an $SiCl_4$ gas supply portion 51s which supplies an $SiCl_4$ gas, a $GeCl_4$ gas supply portion 51g which supplies a $GeCl_4$ gas, a carrier gas supply portion 51c which supplies a carrier gas, an etching gas supply portion 51*e* which supplies an etching gas, a gas supply pipe 54 which supplies an $SiCl_4$ gas, a $GeCl_4$ gas, a carrier gas, an etching gas, and the like to the glass tube 15G, an exhaust gas treatment portion 57 which treats an unnecessary gas discharged from the glass tube 15G, a pressurized gas supply portion 56 which supplies a pressurizing gas to the gas discharge side of the glass tube 15G, and a burner 58 which is movable in the longitudinal direction of the glass tube 15G and heats the outer peripheral surface of the glass tube 15G.

In the embodiment, the chucking portion 55*a* fixes one end portion of the glass tube 15G, and the chucking portion 55*b* fixes the other end portion of the glass tube 15G, so that the glass tube 15G is supported by the chucking portions 55*a* and 55*b*. The chucking portions 55*a* and 55*b* may fix the glass tube 15G so as to be inclined upward. That is, the chucking portions 55*a* and 55*b* may fix the glass tube 15G in a flapped state, and in a case where both end portions of the glass tube 15G are respectively fixed in a flapped state, the glass tube 15G is warped in a mountain shape. Further, the respective chucking portions 55*a* and 55*b* are configured to be rotatable about the axis of the glass tube 15G.

Further, the gas supply pipe 54 is configured such that its front end is slightly inserted into a through-hole H of the glass tube 15G in a state where the glass tube 15G is fixed to the chucking portion 55*a*.

The $SiCl_4$ gas supply portion 51*s* is configured to supply $SiCl_4$ as steam, for example, $SiCl_4$ bubbling system. Further, the $GeCl_4$ gas supply portion 51*g* is configured to supply $GeCl_4$ as steam, for example, $GeCl_4$ bubbling system. Further, the carrier gas supply portion 51*c* generates a carrier gas which carries a $SiCl_4$ gas or a $GeCl_4$ gas. The carrier gas is formed of, for example, an inert gas such as a nitrogen gas. In a case where the carrier gas is a nitrogen gas, a nitrogen gas having a small amount of impurities may be supplied when a device generating an $N_2$ gas from liquid nitrogen is used. Further, the etching gas supply portion 51*e* is configured to supply an etching gas capable of etching the glass tube 15G, and as such an etching gas, an $SF_6$ gas may be exemplified.

Furthermore, respective pipes are connected to the $SiCl_4$ gas supply portion 51*s*, the $GeCl_4$ gas supply portion 51*g*, the carrier gas supply portion 51*c*, and the etching gas supply portion 51*e*, and these pipes are connected to the gas supply pipe 54. Accordingly, the respective gases are supplied into the through-hole H of the glass tube 15G through the gas supply pipe 54. Further, a valve (not illustrated) is provided in the course of each pipe, and hence the supply of each gas may be controlled.

The exhaust gas treatment portion 57 is configured to accumulate an unnecessary gas discharged from the through-hole H of the glass tube 15G.

The pressurized gas supply portion 56 is disposed at the gas discharge side of the glass tube 15G, and is configured to supply a pressurized gas from a direction substantially perpendicular to the longitudinal direction of the glass tube 15G. As the pressurized gas, an inert gas such as a nitrogen gas may be exemplified.

The burner 58 is, for example, an oxyhydrogen burner, and as described above, is configured to be movable in the longitudinal direction of the glass tube 15G.

Figure 5:
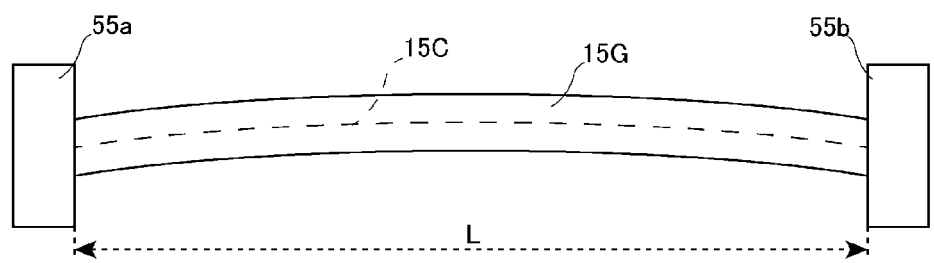
FIG. 5 is a diagram illustrating a state where the glass tube is fixed.

Both end portions of the glass tube 15G are fixed by the pair of chucking portions 55*a* and 55*b* of the base material manufacturing device 50. FIG. 5 is a diagram illustrating a state where both end portions of the glass tube 15G are fixed. As illustrated in FIG. 5, when the glass tube 15G is heated in the etching step P2 or the laminating step P3 to be described later, both end portions of the glass tube 15G are warped so that the axis 15C between the fixed portions of the glass tube 15G has a shape obtained by reversing the catenary curve in the vertical direction.

The catenary curve is also called a catenary curve or a catenary line, and is an arch-like curve obtained when both end portions of a structure such as a rope or a wire are supported and its center portion is naturally dropped downward.

The catenary curve is expressed by formula (1) below as the equation of the catenary curve, and may be also applied to a case where the glass tube 15G having a predetermined temperature is supported at two positions and the glass tube 15G between the respective support portions is dropped.

$$y = a\cosh\left(\frac{x}{a}\right) \qquad (1)$$

Here, the original point becomes the middle point of the line connecting the respective radial centers of two support positions of the glass tube 15G. That is, on the assumption that the supported glass tube 15G is not warped at all, the middle point of the axis 15C between the support portions becomes the original point, the horizontal direction passing the original point is the x axis, and the vertical direction is the y direction. a is a value which defines the scale of the catenary curve, and is a parameter which reflects the strength of the glass tube 15G.

When the linear distance between the respective support portions of the glass tube 15G is denoted by L, the warpage amount Y of the axis 15C of the glass tube 15G may be expressed by formula (2) below.

$$Y = a\left(\cosh\left(\frac{L}{2a}\right) - \cosh(0)\right) \qquad (2)$$

Further, the warpage amount of the glass tube 15G may be expressed by formula (3) below from the dimension of the glass tube 15G and the distance L.

$$Y = \frac{5wL^4}{384EI} \qquad (3)$$

Here, E is a Young's modulus of the glass tube at the above-described predetermined temperature, and I is a secondary moment in the cross section.

From formula (2) and formula (3), the parameter a may be obtained.

Further, the inclination of the axis of the glass tube 15G is equal in the differential of formula (1). Therefore, the inclination of the glass tube 15G of the support portion of the glass tube may be expressed by formula (4) below.

$$y' = \sinh\left(\frac{L}{2a}\right) \qquad (4)$$

When a obtained as described above is applied to formula (4), the absolute value of the inclination of the support portion of the glass tube 15G warped downward may be obtained.

Furthermore, even when the inclination of the support portion of the glass tube 15G is not obtained from the above-described equation, the inclination of the axis 15C at both end support portions may be obtained in a manner such that the glass tube 15G having a predetermined temperature is supported at two positions and is dropped.

For example, in a case where both end portions of a glass tube having a length of 2000 mm, an outer diameter of 45 mm, and an inner diameter of 40 mm are supported, the warpage amount becomes 0.28 mm at the temperature of 2050° C., and the absolute value of the inclination of the support portion becomes 0.56/1000.

In the base material manufacturing device 50 of the embodiment, the portions supporting the glass tube 15G are the chucking portions 55a and 55b. Accordingly, in order that the axis 15C of the glass tube 15G has a shape obtained by reversing the catenary curve in the vertical direction, the glass tube 15G is flapped so that the fixed portions of the glass tube 15G are inclined upward in a direction from the end portion of the glass tube 15G toward the center thereof, and the inclination may become the absolute value of the inclination obtained in formula (4). Here, since the viscosity of the glass is different depending on the temperature, the catenary curve of the axis of the glass tube 15G becomes different depending on the temperature. Accordingly, in this step, the axis of the glass tube 15G is made to have the catenary curve at the temperature of the glass tube 15G in the etching step P2 or the laminating step P3 to be described later.

In this way, in a state where the glass tube 15G is fixed at two positions by the chucking portions 55a and 55b so as to be flapped, and the glass tube 15G is set on the base material manufacturing device 50 while being warped upward. In this way, the preparing step P1 is completed.

<Etching Step P2>

Next, the inner wall of the glass tube 15G which is set on the base material manufacturing device 50 is etched. Specifically, the glass tube 15G is rotated about the axis by rotating the chucking portions 55a and 55b, and the glass tube 15G is heated by reciprocating the burner 58 along the longitudinal direction of the glass tube 15G. The temperature of the glass tube 15G at this time is not particularly limited as long as the glass tube may be etched, but for example, 1900° C. to 2100° C.

As described above, since the glass tube 15G is fixed so that the axis 15C has a shape obtained by reversing the catenary curve in the vertical direction in a heated state, in this step, the glass tube 15G is warped upward so that the axis 15C becomes a catenary curve reversed in the vertical direction.

In this way, since the glass tube 15G may be warped, it is possible to prevent a difference in force along the longitudinal direction of the glass tube 15G by the upper radial portion of the glass tube 15G and the lower radial portion of the glass tube 15G. Accordingly, although the heated glass tube 15G may be easily deformed, it is suppressed to form a bending which is maintained to be locally bent or warped.

In a case where the absolute value of the inclination of the axis 15C of the fixed portion of the glass tube 15G fixed at this time is denoted by A, the absolute value of the inclination (formula (4)) of the axis 15C of the fixed portion of the glass tube 15G obtained from formula (1) of the catenary curve of the glass tube 15G is denoted by B, and the linear distance between the respective fixed portions of the glass tube 15G is denoted by L, it is preferable to satisfy formula (5) below.

$$\frac{|B-A|}{L^2} \leq 0.000100 \tag{5}$$

Even in a case where the glass tube 15G is fixed so that the axis 15C of the glass tube 15G has a shape obtained by reversing the catenary curve in the vertical direction while the glass tube 15G is heated, an error may occur in the inclination of the axis 15C of the fixed portion of the galas tube 15G due to the precision and the like of the chucking portions 55a and 55b. The inventors found that the amount of the bending generated in the glass tube 15G becomes 0.3 mm or less when the value obtained by dividing |B-A| as the absolute value of the error by the square of the linear distance between the fixed portions of the glass tube is 0.000150 or less. In such a bending amount, the laminating step P3 to be described later is not substantially influenced by the bending, and the optical fiber base material 10P that may manufacture the sufficiently highly reliable optical fiber may be manufactured.

Further, it is preferable to satisfy formula (6) below.

$$\frac{|B-A|}{L^2} \leq 0.000125 \tag{6}$$

In such an error, the bending amount may be suppressed to be 0.15 mm or less. Further, it is preferable to satisfy formula (7) below.

$$\frac{|B-A|}{L^2} \leq 0.000100 \tag{7}$$

The inventors found that the bending amount of the glass tube 15G is substantially equal to that of the case without any error in the case of an error satisfying such an equation. Accordingly, the bending amount of the glass tube 15G may be suppressed to be minimal by satisfying formula (7).

Then, an etching gas is supplied from the etching gas supply portion 51e and a carrier gas is supplied from the carrier gas supply portion 51c during a time in which the glass tube 15G is heated, and these gases are supplied into the through-hole H of the glass tube 15G through the gas supply pipe 54. Furthermore, a pressurized gas is supplied from the pressurized gas supply portion 56 so that the glass tube 15G is not contracted due to the heating at this time, and the inside of the through-hole H of the glass tube 15G is pressurized so that the outer diameter of the glass tube 15G becomes constant. Furthermore, as described above, since the etching gas is supplied from the etching gas discharge side of the glass tube, the dilution of the etching gas by the pressurized gas is suppressed, and the etching may be performed according to the designed value.

In this way, the inner wall of the glass tube 15G is etched by the etching gas.

<Laminating Step P3>

Next, the glass layer is laminated on the inner wall of the glass tube 15G subjected to the etching step. That is, the glass is mounted on the inside. In the embodiment, a clad glass layer which becomes the clad glass body 12P is first laminated on the inner wall of the glass tube 15G, and then a core glass layer which becomes the core glass body 11P is laminated thereon. Hereinafter, a case of performing the step using the MCVD method will be described.

Figure 6:
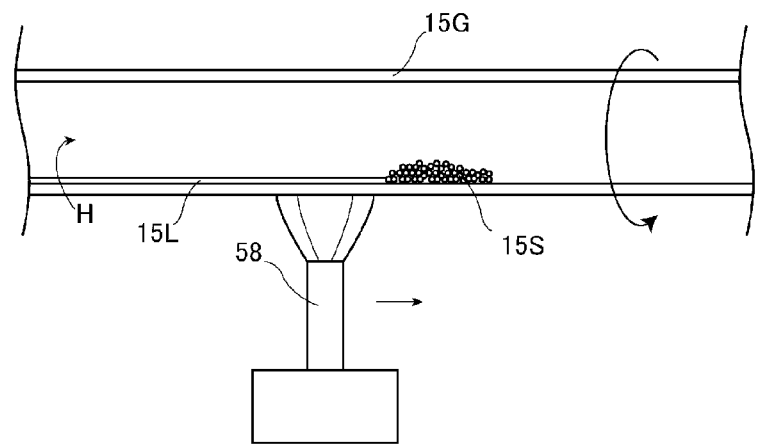
FIG. 6 is a diagram illustrating an appearance of a laminating step.

FIG. 6 is a diagram illustrating an appearance of the laminating step P3 using the MCVD method. Furthermore, in FIG. 6, the warpage of the glass tube 15G is not illustrated. As illustrated in FIG. 6, in the laminating step P3, as in the etching step P2, the chucking portions 55a and 55b are rotated so as to rotate the glass tube 15G about its axis, and the burner 58 is moved along the longitudinal direction of the glass tube 15G so as to heat the glass tube 15G. In the MCVD method, in a so-called forward traverse in which the burner 58 moves from the supply side of a raw material gas such as $SiCl_4$ or $GeCl_4$ to the discharge side thereof, soot 15S derived from the raw material gas is deposited on the discharge side in relation to the burner 58, the deposited soot 15S is heated by the movement of the burner 58, and the glass layer 15L is laminated. Then, the laminated glass layer 15L becomes a part of the glass tube 15G, and the thickness of the glass tube 15G is thickened whenever the glass layer 15L is laminated. Furthermore, in the forward traverse, the burner 58 is moved at a comparatively low speed. Further, since a so-called backward traverse in which the burner moves from the discharge side the raw material gas to the supply side thereof is not concerned with the formation of the glass layer, the burner moves fast so as to return the burner to the supply side of the raw material gas.

Since the rotation speed of the glass tube 15G and the movement speed of the burner 58 in the forward traverse are different depending on the thickness or the diameter of the glass tube 15G, the rotation speed and the movement speed are not particularly limited. However, for example, the rotation speed of the glass tube 15G is 5 rpm to 50 rpm and the movement speed of the burner 58 is 50 mm/min to 200 mm/min. Further, the temperature of the glass tube 15G in the forward traverse is not particularly limited as long as the glass layer 15L is adopted in which soot 15S of the raw material gas is deposited and the deposited soot becomes glass. However, the temperature is, for example, 1900° C. to 2300° C.

As described above, since the glass tube 15G is fixed so that the axis 15C has a shape obtained by reversing the catenary curve in the vertical direction in the heated state, even in this step, as in the etching step P2, the axis 15C becomes the catenary curve which is reversed in the vertical direction.

Accordingly, even in this step, although the heated glass tube 15G may be easily deformed, it is difficult to form a bending which is maintained to be locally bent or warped. Further, even in this step, it is preferable to satisfy formula (5) above, it is more preferable to satisfy formula (6) above, and it is further preferable to satisfy formula (7) above.

In the lamination of the clad glass layer, a carrier gas and an $SiCl_4$ gas (a raw material gas) are supplied from the carrier gas supply portion 51c and the $SiCl_4$ gas supply portion 51s of the base material manufacturing device 50 into the glass tube 15G through the gas supply pipe 54.

Further, when the clad glass layer is laminated by a predetermined number, the core glass layer is laminated. In the lamination of the core glass layer, a raw material gas which is formed of a carrier gas, an $SiCl_4$ gas, and a $GeCl_4$ gas is supplied into the glass tube 15G from the carrier gas supply portion 51c, the $SiCl_4$ gas supply portion 51s, and the $GeCl_4$ gas supply portion 51g of the base material manufacturing device 50 through the gas supply pipe 54.

Furthermore, even in this step, as in the etching step P2, a pressurized gas is supplied from the pressurized gas supply portion 56 so that the glass tube 15G is not contracted due to the heat, and the inside of the through-hole H of the glass tube 15G is pressurized so that the outer diameter of the glass tube 15G becomes constant. As described above, since the pressurized gas is supplied from the discharge side of the raw material gas of the glass tube, the dilution of the raw material gas by the pressurized gas is suppressed, and hence the lamination of the glass layer 15L may be performed according to the design value.

In this way, the clad glass layer and the core glass layer are laminated by a predetermined number.

<Collapse Step P4>

In the step, the supply of the raw material gas is stopped after the clad glass layer and the core glass layer are laminated, and the burner 58 is reciprocated so as to heat the glass tube 15G. By the heating, the through-hole H of the glass tube 15G is contracted and the through-hole H is crushed.

Furthermore, in the step, an etching step in which the inner wall of the glass tube 15G is etched may be performed before the through-hole H of the glass tube 15G decreases in diameter or while the through-hole H decreases in diameter. The etching step in this case may be performed as in the above-described etching step P2. That is, the glass tube 15G is etched in a state where an axis 15C is warped upward so as to have a catenary curve of a vertically reverse shape. In this way, even when the etching step is performed before or during the collapse step P4, the bending of the optical fiber base material may be suppressed. Furthermore, as in the step, the glass tube 15G on which the glass layer 15L is laminated indicates the glass tube 15G on which the glass layer 15L is not laminated yet and the glass tube which is formed of the laminated glass layer 15L, and the inner wall in this case becomes the inner wall of the laminated glass layer 15L. In this way, the optical fiber base material 10P illustrated in FIG. 2 is obtained.

<Drawing Step P5>

Figure 7:
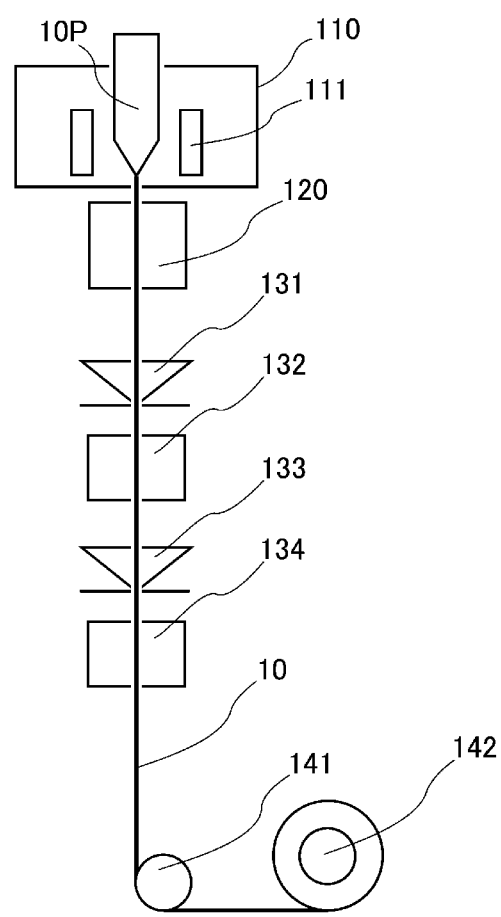
FIG. 7 is a diagram illustrating an appearance of a drawing step.

FIG. 7 is a diagram illustrating an appearance of the drawing step P5.

First, the optical fiber base material 10P which is manufactured by the preparing step P1 to the collapse step P4 as preparation steps for performing the drawing step P5 is set on a spinning furnace 110. Then, the optical fiber base material 10P is heated by generating heat from a heating portion 111 of the spinning furnace 110. The lower end of the optical fiber base material 10P at this time is heated at, for example, 2000° C. and becomes a melted state. Then, glass is melted from the optical fiber base material 10P, and glass is drawn. When the drawn melted glass exits the spinning furnace 110, the melted glass is immediately solidified. Accordingly, the core glass body 11P becomes the core 11, and the clad glass body 12P becomes the clad 12, thereby obtaining the optical fiber having the core 11 and the clad 12. Subsequently, the optical fiber passes through a cooling device 120, and is cooled to an appropriate temperature. The temperature of the optical fiber when entering the cooling device 120 is, for example, about 1800° C., but the temperature of the optical fiber when exiting the cooling device 120 is, for example, 40° C. to 50° C.

Next, the optical fiber passes through a coating device 131 provided with a UV-ray curable resin becoming the first coating layer 13 and is coated by the UV-ray curable resin. Further, the optical fiber passes through the UV-ray irradiating device 132 so as to be irradiated with an UV ray, so that the UV-ray curable resin is cured and the first coating layer 13 is formed. Next, the optical fiber passes through a coating device 133 provided with a UV-ray curable resin becoming the second coating layer 14, and is coated by the UV-ray curable resin. Further, the optical fiber passes through a UV-ray irradiating device 134 so as to be irradiated with a UV ray, so that the UV-ray curable resin is cured and the second coating layer 14 is formed, thereby obtaining the optical fiber 10 illustrated in FIG. 1.

Then, the direction of the optical fiber 10 is changed by a turn pulley 141 and the optical fiber is wound by the reel 142.

As described above, according to the method of manufacturing the optical fiber base material 10P of the embodiment, since the glass tube 15G may be warped so that the axis 15C has a shape in which the catenary curve is reversed in the vertical direction in the step of heating the glass tube such as the etching step P2 or the laminating step P3, it is possible to suppress a difference in force along the longitudinal direction of the glass tube 15G by the upper radial portion of the glass tube 15G and the lower radial portion of the glass tube 15G. Accordingly, it is possible to suppress the bending in which the glass tube 15G is locally bent or warped while the glass tube 15G is heated. For this reason, the whirling of the glass tube 15G may be suppressed. Accordingly, in the laminating step P3, a change in distance between the rotating glass tube 15G and the burner 58 is suppressed, and hence it is possible to suppress a heating from being unevenly generated in the circumferential direction of the glass tube 15G when heating the glass tube 15G. For this reason, the soot which is derived from the raw material gas is deposited with a constant thickness in the circumferential direction of the glass tube 15G, and the thickness of the glass layer 15L in which the soot is laminated as glass becomes constant in the circumferential direction of the glass tube 15G. In this way, the thickness of the glass tube 15G is maintained to be constant. The eccentricity of the optical fiber base material 10P which is manufactured by such a process is suppressed, and since there is no member such as an auxiliary support member that comes into contact with the glass tube 15G in the middle of the glass tube, the mixture of impurities is prevented. Accordingly, the highly reliable optical fiber 10 may be manufactured by drawing the optical fiber base material 10P.

Further, in the embodiment, the etching step P2 of etching the inner wall of the glass tube is performed before the glass is mounted on the inside by the laminating step P3. Even in the etching step P2, since the glass tube 15G may be warped so that the axis 15C has a shape in which the catenary curve is reversed in the vertical direction, the bending of the glass tube may be suppressed. Accordingly, since the bending of the glass tube 15G used in the laminating step P3 is suppressed from the first time of the laminating step P3, it is possible to suppress the soot from being unevenly distributed in the circumferential direction of the glass tube in a case where the glass layer is laminated on the inner wall of the glass tube. Accordingly, according to the method of manufacturing the optical fiber base material 10P of the embodiment, the bending of the glass tube in the etching step P2 is suppressed, and the bending of the glass tube in the laminating step P3 is further suppressed. Accordingly, it is possible to suppress the core of the manufactured optical fiber base material from being unevenly distributed.

Second Embodiment

Figure 8:
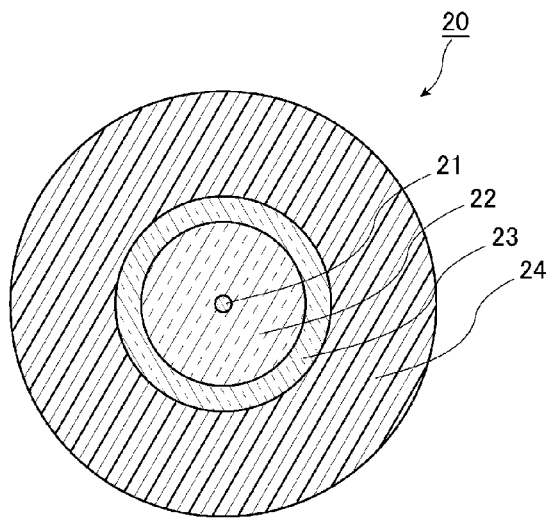
FIG. 8 is a diagram illustrating a structure of a cross section perpendicular to a longitudinal direction of an optical fiber according to a second embodiment of the invention.

Next, a second embodiment of the invention will be described in detail by referring to FIG. 8. Furthermore, the identical reference numerals will be given to the identical or similar components to those of the first embodiment unless there is a particular description, and the description thereof will not be repeated. FIG. 8 is a diagram illustrating a structure of a cross section perpendicular to a longitudinal direction of an optical fiber according to the second embodiment of the invention.

As illustrated in FIG. 8, an optical fiber 20 of the embodiment is an amplification optical fiber (a double clad fiber) in which an active element is added to a core, and includes a core 21, a clad 22 which surrounds the core 21, a resin clad 23 which coats the clad 22, and a coating layer 24 which coats the resin clad 23. The refractive index of the clad 22 is lower than the refractive index of the core 21, and the refractive index of the resin clad 23 is further lower than the refractive index of the clad 22. As a material of forming such a core 21, glass in which an active element such as Yb pumped by pumping light is added to the same material as that of the core 11 of the optical fiber 10 of the first embodiment may be exemplified. As such an active element, a rare-earth element may be exemplified, and as the rare-earth element, thulium (Tm), cerium (Ce), neodymium (Nd), europium (Eu), erbium (Er), and the like may be exemplified other than the Yb. Furthermore, as the active element, bismuth (Bi) and the like may be exemplified other than the rare-earth element. Further, as a material of forming the clad 22, for example, the same material as that of the clad 12 of the optical fiber 10 of the first embodiment may be exemplified. Further, as a material of forming the resin clad 23, for example, a light transmissive UV-ray curable resin may be exemplified, and as a material of forming the coating layer 24, the same material as that of the second coating layer 14 of the optical fiber 10 of the first embodiment may be exemplified.

The optical fiber base material used to manufacture the optical fiber 20 has the same appearance as that of the optical fiber base material 10P illustrated in FIG. 2, and is different from the optical fiber base material 10P in that the active element is added to the core glass body 11P.

The method of manufacturing the optical fiber 20 is as below.

(First Manufacturing Method)

In a first manufacturing method, the preparing step P1 and the etching step P2 are performed as in the method of manufacturing the optical fiber base material 10P of the first embodiment. Furthermore, even in the manufacturing method of the embodiment, in the preparing step P1, as in the preparing step P1 of the first embodiment, both end portions of the glass tube 15G are fixed so that the axis 15C of the glass tube 15G has a shape in which the catenary curve is reversed in the vertical direction when the glass tube 15G is heated in the etching step P2 or the laminating step P3. Accordingly, even in the embodiment, the bending may be suppressed in the etching step P2.

Then, the step of laminating the clad glass layer of the laminating step P3 is performed as in the step of laminating the clad glass layer of the first embodiment, and in the step of laminating the core glass layer, a gas in which an active element changed to a gas phase is supplied into the through-hole H of the glass tube 15G in addition to a carrier gas, a $SiCl_4$ gas, and a $GeCl_4$ gas. Accordingly, the base material manufacturing device of the embodiment includes a heating device that changes an active element into a gas phase in addition to the configuration of the base material manufacturing device 50 of the first embodiment, and the active element which is changed as the gas phase by the heating device is supplied into the through-hole H of the glass tube 15G through the gas supply pipe 54. Furthermore, even in the embodiment, the bending in the laminating step P3 is suppressed due to the same reason as that of the first embodiment.

Then, the collapse step P4 is performed as in the first embodiment after a predetermined number of the core glass layers are laminated, and the optical fiber base material for manufacturing the optical fiber 20 of FIG. 8 is obtained.

Next, the drawing step P5 is performed. The drawing step P5 is different from the drawing step P5 of the first embodiment in that the UV-ray curable resin becoming the resin clad 23 is used instead of the UV-ray curable resin becoming the first coating layer 13 in the coating device 131, and the other points are the same as those of the drawing step P5 of the first embodiment.

In this way, the optical fiber 20 illustrated in FIG. 8 is obtained.

(Second Manufacturing Method)

In a second manufacturing method, the preparing step P1 and the etching step P2 are performed as in the first manufacturing method, and further the clad glass layer of the laminating step P3 is laminated as in the first manufacturing method. Furthermore, even in the manufacturing method, the bending of the glass tube 15G in the etching step P2 is suppressed due to the same reason as that of the first manufacturing method.

Then, the lamination of the core glass layer in the laminating step P3 is performed as below. First, the glass tube 15G on which the clad glass layer is laminated is rotated as in the first embodiment and the burner 58 is moved from the supply side of the raw material gas to the discharge side. Then, as in the first embodiment, a carrier gas, a $SiCl_4$ gas, and a $GeCl_4$ gas are supplied. Here, in the first embodiment, the raw material gas is changed as soot, and the soot is changed as the glass layer. However, in the manufacturing method, the raw material gas is changed as soot, but at this time point, the soot is not changed as the glass layer. This point is different from the lamination of the core glass layer of the first embodiment. Then, in the manufacturing method, a solution containing an active element is impregnated into a gap of the deposited soot, and then is dried. In this way, the active element is held in the gap of the soot. Then, the glass tube is heated again so as to obtain the core glass layer in which the active element and the soot are integrated with each other. Furthermore, even in the manufacturing method, when the glass tube is heated so as to deposit the soot becoming the core glass layer, it is possible to suppress the bending of the glass tube 15G due to the same reason as that of the laminating step P3 of the first embodiment.

Subsequently, the collapse step P4 is performed, and the drawing step P5 is performed as in the first manufacturing method, thereby obtaining the optical fiber 20 of FIG. 8. Furthermore, even in the embodiment, as in the first embodiment, the etching step may be performed before or during the collapse step P4.

As described above, the invention has been described by exemplifying the first and second embodiments, but the invention is not limited thereto.

For example, the optical fiber of the first embodiment is not limited to a single-mode fiber, and may be a multi-mode fiber.

Further, in the laminating step of the first and second embodiments, only the core glass layer may be laminated without laminating the clad glass layer. In this case, the clad glass body 12P may be formed only by using the glass tube 15G to be prepared.

Further, in the above-described embodiment, the MCVD method is used as the inside mounting method and the burner 58 is used as the heat source. However, a heating heater which moves like the burner 58 and surrounds the outer periphery of the glass tube 15G may be used. The method of manufacturing the optical fiber base material using such a heating heater may be considered as a kind of the MCVD method called an FCVD (Furnace Chemical Vapor Deposition) method.

Further, in the above-described embodiment, the laminating step P3 is performed by using the MCVD method as the inside mounting method. However, the invention is not limited thereto. For example, in the laminating step P3, a PCVD (Plasma-activated chemical vapor deposition) method may be used. The PCVD method performs the heating using a plasma instead of the oxyhydrogen flame in the MCVD method. Specifically, in the method, the glass layer 15L is laminated by causing a radical reaction with the surface of the inner wall of the glass tube 15G while the raw material gas is input into the glass tube 15G and becomes a plasma state. When the laminating step P3 is performed by using the PCVD method, fine glass particles are deposited in an amorphous state, and hence a transparent glass layer may be directly formed. Accordingly, the laminating step P3 may be simply performed, and a satisfactory glass layer may be formed.

Further, in the above-described embodiment, in a case where the temperature of the glass tube 15G in the etching step P2 is different from the temperature of the glass tube 15G in the laminating step P3, the end portions of the glass tube may be fixed so that the axis 15C of the glass tube 15G becomes the catenary curve in any one of the steps. Alternatively, the end portions of the glass tube may be fixed at a different inclination between the respective steps so that the axis 15C of the glass tube 15G becomes the catenary curve in the respective steps.

Further, in the above-described embodiments, both end portions of the glass tube 15G are fixed, but the glass tube 15G may be fixed at two positions in the middle of the glass tube.

EXAMPLES

Hereinafter, the contents of the invention are more specifically described by referring to Examples and Comparative Examples, but the invention is not limited thereto.

Example 1

Three glass tubes each having an outer diameter of 45 mm and a thickness of 2 mm were prepared, and each glass tube was set on a base material manufacturing device so that a distance between the fixed portions was 1000 mm. Then, a core glass layer was laminated on each glass tube according to the MCVD method. Furthermore, in a case where the glass tube was set on the base material manufacturing device in this way, it is favorable that the inclination (the ideal inclination) of the axis of the fixed portions of the glass tube obtained from formula (1) to formula (4) is 0.000069 in order that the axis of the glass tube has an ideal shape in which the catenary curve is reversed in the vertical direction. Therefore, in the present example, an error with respect to the ideal inclination was made. Specifically, the glass tube was warped so that the value (the left side of formula (5)) obtained by dividing the error of each glass tube with respect to the ideal inclination by the square of the distance between the fixed portions became 0.000031, 0.000069, and 0.000131. Further, in the MCVD method, the number of rotations of the glass tube was set to 20 rpm, the oxyhydrogen burner was moved at 65 mm/min from the supply side of the raw material gas to the discharge side, and the oxyhydrogen burner traversed 80 times. The temperature of the glass tube in a place with the oxyhydrogen flame at this time was about 2050° C. In the further traverse, the through-hole of the glass tube was pressurized so that the outer diameter of the glass tube became constant.

Example 2

Three glass tubes having the same configuration as that of Example 1 except that the thickness was 3 mm were prepared, each glass tube was set on the base material manufacturing device so that the distance between the fixed portions was set as in Example 1, and the core glass layer was laminated according to the MCVD method as in Example 1. Furthermore, in the case of the glass tube of the present example, the ideal inclination is 0.000072. Therefore, in the present example, the glass tube was warped so that the value obtained by dividing the error with respect to the ideal inclination by the square of the distance between the fixed portions was 0.000028, 0.000072, and 0.000128.

Example 3

Three glass tubes having the same configuration as that of Example 1 except that the outer diameter was 38 mm were prepared, each glass tube was set on the base material manufacturing device so that the distance between the fixed portions was set as in Example 1, and the core glass layer was laminated according to the MCVD method as in Example 1. Furthermore, in the case of the glass tube of the present example, the ideal inclination is 0.000098. Therefore, in the present example, the glass tube was warped so that the value obtained by dividing the error with respect to the ideal inclination by the square of the distance between the fixed portions was 0.000002, 0.000098, and 0.000102.

Example 4

Three glass tubes having the same configuration as that of Example 1 except that the outer diameter was 38 mm and the thickness was 3 mm were prepared, each glass tube was set on the base material manufacturing device so that the distance between the fixed portions was set as in Example 1, and the core glass layer was laminated according to the MCVD method as in Example 1. Furthermore, in the case of the glass tube of the present example, the ideal inclination is 0.000104. Therefore, in the present example, the glass tube was warped so that the value obtained by dividing the error with respect to the ideal inclination by the square of the distance between the fixed portions was 0.000004, 0.000096, and 0.000104.

Example 5

Three glass tubes having the same configuration as that of Example 1 were prepared, each glass tube was set on the base material manufacturing device so that the distance between the fixed portions was 1200 mm, and the core glass layer was laminated according to the MCVD method as in Example 1. Furthermore, in the case of the glass tube of the present example, the ideal inclination is 0.000119. Therefore, in the present example, the glass tube was warped so that the value obtained by dividing the error with respect to the ideal inclination by the square of the distance between the fixed portions was 0.000013, 0.000083, and 0.000056.

Example 6

Three glass tubes having the same configuration as that of Example 2 were prepared, each glass tube was set on the base material manufacturing device so that the distance between the fixed portions was set as in Example 5, and the core glass layer was laminated according to the MCVD method as in Example 1. Furthermore, in the case of the glass tube of the present example, the ideal inclination is 0.000125. Therefore, in the present example, the glass tube was warped so that the value obtained by dividing the error with respect to the ideal inclination by the square of the distance between the fixed portions was 0.000017, 0.000052, and 0.000087.

Example 7

Three glass tubes having the same configuration as that of Example 3 were prepared, each glass tube was set on the base material manufacturing device so that the distance between the fixed portions was set as in Example 5, and the core glass layer was laminated according to the MCVD method as in Example 1. Furthermore, in the case of the glass tube of the present example, the ideal inclination is 0.000170. Therefore, in the present example, the glass tube was warped so that the value obtained by dividing the error with respect to the ideal inclination by the square of the distance between the fixed portions was 0.000021, 0.000049, and 0.000118.

Example 8

Three glass tubes having the same configuration as that of Example 4 were prepared, each glass tube was set on the base material manufacturing device so that the distance between the fixed portions was set as in Example 5, and the core glass layer was laminated according to the MCVD method as in Example 1. Furthermore, in the case of the glass tube of the present example, the ideal inclination is 0.000179. Therefore, in the present example, the glass tube was warped so that the value obtained by dividing the error with respect to the ideal inclination by the square of the distance between the fixed portions was 0.000015, 0.000055, and 0.000124.

Example 9

Three glass tubes having the same configuration as that of Example 1 were prepared, each glass tube was set on the base material manufacturing device so that the distance between the fixed portions was 2000 mm, and the core glass layer was laminated according to the MCVD method as in Example 1. Furthermore, in the case of the glass tube of the present example, the ideal inclination is 0.000552. Therefore, in the present example, the glass tube was warped so that the value obtained by dividing the error with respect to the ideal inclination by the square of the distance between the fixed portions was 0.000088, 0.000113, and 0.000138.

Example 10

Three glass tubes having the same configuration as that of Example 2 were prepared, each glass tube was set on the base material manufacturing device so that the distance between the fixed portions was set as in Example 9, and the core glass layer was laminated according to the MCVD method as in Example 1. Furthermore, in the case of the glass tube of the present example, the ideal inclination is 0.000577. Therefore, in the present example, the glass tube was warped so that the value obtained by dividing the error with respect to the ideal inclination by the square of the distance between the fixed portions was 0.000094, 0.000119, and 0.000144.

Example 11

Two glass tubes having the same configuration as that of Example 3 were prepared, each glass tube was set on the base material manufacturing device so that the distance between the fixed portions was set as in Example 9, and the core glass layer was laminated according to the MCVD method as in Example 1. Furthermore, in the case of the glass tube of the present example, the ideal inclination is 0.000787. Therefore, in the present example, the glass tube was warped so that the value obtained by dividing the error with respect to the ideal inclination by the square of the distance between the fixed portions was 0.000147 and 0.000172.

Example 12

Two glass tubes having the same configuration as that of Example 4 were prepared, each glass tube was set on the base material manufacturing device so that the distance between the fixed portions was set as in Example 9, and the core glass layer was laminated according to the MCVD method as in Example 1. Furthermore, in the case of the glass tube of the present example, the ideal inclination is 0.000829. Therefore, in the present example, the glass tube was warped so that the value obtained by dividing the error with respect to the ideal inclination by the square of the distance between the fixed portions was 0.000157 and 0.000182.

Figure 9:
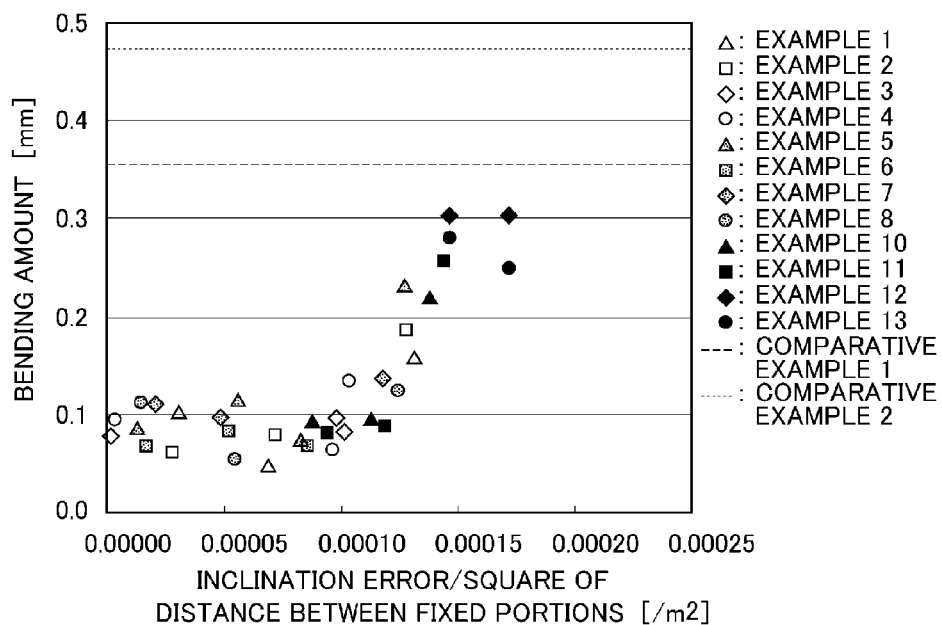
FIG. 9 is a diagram illustrating a relation between the bending amount of the glass tube and the value obtained by dividing the error between the inclination of the axis of the fixed portion obtained from the equation of the catenary curve and the inclination of the axis of the fixed portion of each example by the square of the distance between the fixed portions of the glass tube.

Next, the amount of the bending of the glass tube of each of Example 1 to Example 12 was examined. The result is illustrated in FIG. 9. FIG. 9 is a diagram illustrating a relation between the bending amount of the glass tube and the value (the value of the left side of formula (5)) obtained by dividing the error between the inclination of the axis of the fixed portion obtained from the equation of the catenary curve and the inclination of the axis of the fixed portion of each example by the square of the distance between the fixed portions of the glass tube. As illustrated in FIG. 9, when the value (the value of the left side of formula (5)) is 0.000150 or less regardless of the outer diameter of the glass tube, the thickness thereof, or the distance between the fixed portions, the bending amount of the glass tube becomes 0.3 mm or less. Further, when the value is 0.000125 or less, the bending amount becomes 0.15 mm or less. Furthermore, when the value is 0.000100 or less, the bending amount of the glass tube is substantially equal to the value in the case without any error.

Comparative Example 1

The glass tube having the same configuration as that of Example 11 was prepared, each glass tube was set on the base material manufacturing device as in Example 11, and the core glass layer was laminated according to the MCVD method as in Example 1. Furthermore, in the case of the glass tube of the comparative example, the glass tube was made to be horizontal in the respective chucking portions.

Comparative Example 2

The glass tube having the same configuration as that of Example 12 was prepared, each glass tube was set on the base material manufacturing device as in Example 12, and the core glass layer was laminated according to the MCVD method as in Example 1. Furthermore, in the case of the glass tube of the comparative example, the glass tube was made to be horizontal in the respective chucking portions.

Next, as in Examples, the bending amount of the glass tube of Comparative Example 1 and Comparative Example 2 was examined. This result is indicated by the dashed line in FIG. 9. As illustrated in FIG. 9, the bending amount of each comparative example was larger than the bending amount of the glass tube of each of Example 1 to Example 12.

As described above, in a case where the above-described value (the value of the left side of formula (5)) is 0.000150 or less regardless of the outer diameter of the glass tube, the thickness thereof, or the distance between the fixed portions, the bending amount of the glass tube becomes 0.3 mm or less. When the value is 0.000125 or less, the bending amount becomes 0.15 mm or less. When the value is 0.000100 or less, the bending amount of the glass tube is substantially equal to the value in a case without any error.

As described above, according to the invention, a method of manufacturing an optical fiber base material that may manufacture a highly reliable optical fiber and a method of manufacturing an optical fiber using the same are provided.

What is claimed is:

1. A method of manufacturing an optical fiber base material comprising steps of:
   (a) preparing a glass tube; and
   (b) rotating and heating the glass tube fixed at two positions and supplying a gas into a through-hole of the glass tube,
   wherein the glass tube is fixed such that an axis of the glass tube has a substantially inverted catenary curve shape in the vertical direction while the glass tube is heated.

2. The method of manufacturing the optical fiber base material according to claim 1, wherein $$\frac{|B - A|}{L^2} \leq 0.000150$$

is satisfied,
   wherein A is an absolute value of an inclination of the axis at the fixed portions of the fixed glass tube,
   B is an absolute value of an inclination of the axis at the fixed portions of the glass tube obtained from an equation of a catenary curve of the glass tube, and
   L is a linear distance between the respective fixed portions.

3. The method of manufacturing the optical fiber base material according to claim 2, wherein
   the gas is a raw material gas for laminating the glass layer, and
   in the step (b), a glass layer is laminated on an inner wall of the glass tube by the raw material gas.

4. The method of manufacturing the optical fiber base material according to claim 3, wherein
   in the step (b), an MCVD method is used.

5. The method of manufacturing the optical fiber base material according to claim 2, wherein
   the gas is an etching gas, and
   the step (b) further comprises etching the inner wall of the glass tube by the etching gas.

6. The method of manufacturing the optical fiber base material according to claim 2, wherein $$\frac{|B-A|}{L^2} \leq 0.000125$$

is satisfied.

7. The method of manufacturing the optical fiber base material according to claim 6, wherein
the gas is a raw material gas for laminating the glass layer, and
in the step (b), a glass layer is laminated on an inner wall of the glass tube by the raw material gas.

8. The method of manufacturing the optical fiber base material according to claim 7, wherein
in the step (b), an MCVD method is used.

9. The method of manufacturing the optical fiber base material according to claim 6, wherein
the gas is an etching gas, and
the step (b) further comprises etching the inner wall of the glass tube by the etching gas.

10. The method of manufacturing the optical fiber base material according to claim 6, wherein $$\frac{|B-A|}{L^2} \leq 0.000100$$

is satisfied.

11. The method of manufacturing the optical fiber base material according to claim 10, wherein
the gas is a raw material gas for laminating the glass layer, and
in the step (b), a glass layer is laminated on an inner wall of the glass tube by the raw material gas.

12. The method of manufacturing the optical fiber base material according to claim 11, wherein
in the step (b), an MCVD method is used.

13. The method of manufacturing the optical fiber base material according to claim 10, wherein
the gas is an etching gas, and
the step (b) further comprises etching the inner wall of the glass tube by the etching gas.

14. The method of manufacturing the optical fiber base material according to claim 1, wherein
the gas is an etching gas, and
the step (b) further comprises etching the inner wall of the glass tube by the etching gas.

15. The method of manufacturing the optical fiber base material according to claim 1, wherein
the gas is a raw material gas for laminating the glass layer, and
in the step (b), a glass layer is laminated on an inner wall of the glass tube by the raw material gas.

16. The method of manufacturing the optical fiber base material according to claim 15, wherein
in the step (b), an MCVD method is used.

17. A method of manufacturing an optical fiber comprising steps of:
preparing a glass tube;
rotating and heating the glass tube fixed at two positions and supplying a gas into a through-hole of the glass tube to form an optical fiber base material, wherein the glass tube is fixed such that an axis of the glass tube has a substantially inverted catenary curve shape in the vertical direction while the glass tube is heated; and
drawing the optical fiber base material.

* * * * *